Oct. 6, 1964　　　E. F. MITCHELL, JR　　　3,151,649
AUTOMOBILE DOOR SUPPORTED CARRYING POUCH
Filed May 8, 1961　　　　　　　　　　　　　2 Sheets-Sheet 1
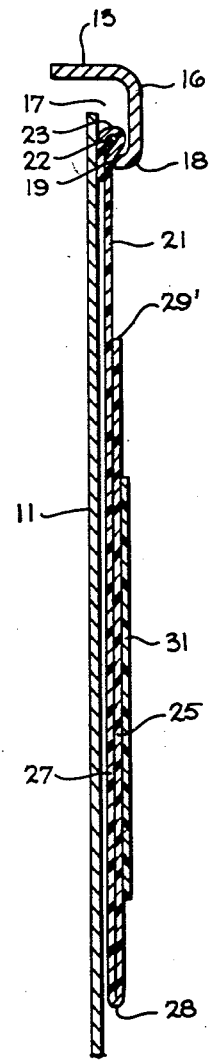
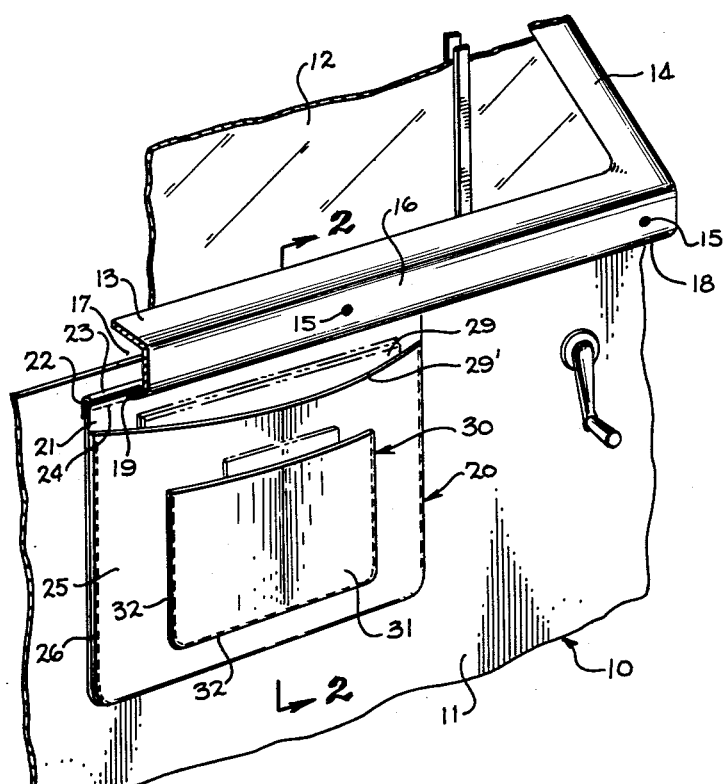
EARL F. MITCHELL, JR.
INVENTOR.
BY
Beehler & Shanahan
ATTORNEYS Oct. 6, 1964  E. F. MITCHELL, JR  3,151,649
AUTOMOBILE DOOR SUPPORTED CARRYING POUCH
Filed May 8, 1961  2 Sheets-Sheet 2
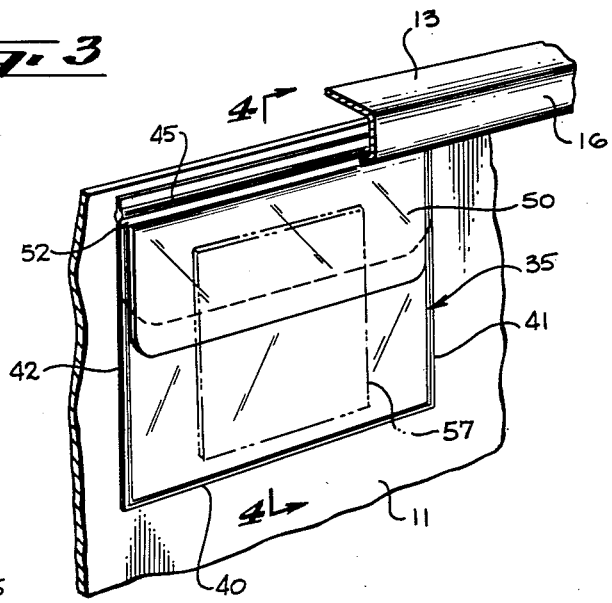
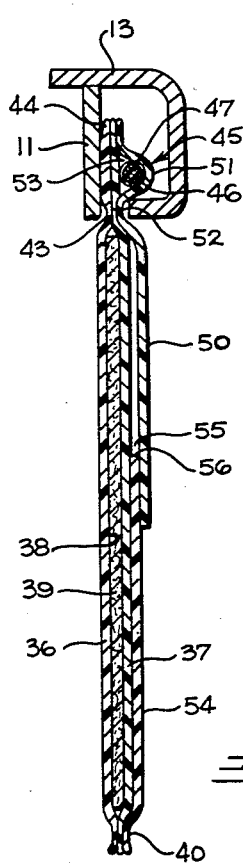
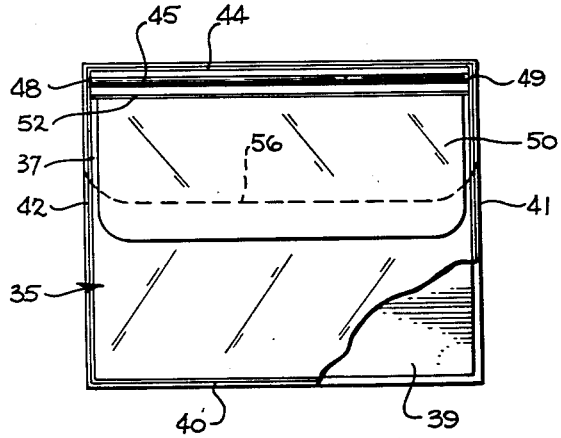
EARL F. MITCHELL, JR.
INVENTOR.
BY
Beehler & Shanahan
ATTORNEYS

United States Patent Office

3,151,649
Patented Oct. 6, 1964

3,151,649
AUTOMOBILE DOOR SUPPORTED
CARRYING POUCH
Earl F. Mitchell, Jr., 2420 Hyperion Ave.,
Los Angeles, Calif.
Filed May 8, 1961, Ser. No. 108,441
1 Claim. (Cl. 150—1)

The invention relates to carrying devices forming part of an automobile door to provide additional carrying space within the automobile that is conveniently accessible to a person driving or riding in the automobile. The device more particularly is embodied in a generally flexible carrying pouch adapted to be suspended from the window molding, or other elongated clamping means where necessary, against the inside panel of an automobile door, for carrying maps, order blanks, papers, books, writing materials, and the like.

Prior art attempts to provide carrying devices that could be attached to the inside of an automobile door involved carrying structures that were suspended from the automobile door window molding on rigid suspension or support members, and most of the container devices thus suspended were also rigid. These prior art rigid devices have had a tendency to scratch the window molding in the automobile or to tear the fabric which lines the inside panel of the automobile door. Also, the rigid nature of these devices has prevented them from lying generally flat against the inside panel of the door, and there have often been rigid projections which were in the way of the driver or passenger of the automobile. Moreover these prior used rigidly suspended carrying devices normally have been restricted in their carrying capacity because of the fixed dimensions of their rigid construction.

Prior map carrying devices for automobiles to a large degree have either comprised closed pouches from which the maps have had to be removed for use, or were complex and required special map shapes, such as elongated map rolls.

In view of these and other problems in the art, among the objects of my present invention is to provide an automobile door carrying pouch which is generally flexible, and which will therefore lie generally flat against the inside panel of an automobile door, in contour with the door.

Another object of my present invention is to provide an automobile door carrying pouch of the character described which is provided with a bead extending along substantially the entire upper edge of the device, this bead being operatively engageable under the bottom flange or lip of the automobile door molding, or by other elongated clamping means where necessary, whereby substantially uniform support will be provided over the entire width of the carrying pouch.

Another object of my present invention is to provide an automobile door carrying pouch of the character described which, because of its flexibility, will normally not be obtrusive yet which is capable of carrying a relatively large quantity of material.

A further object of my present invention is to provide an automobile door carrying pouch of the character described which is provided with a transparent front cover member whereby a map may be carried in said pouch, in a folded condition if necessary, with the portion of the map currently in use visible through said transparent front cover member, the pouch being composed of a flexible material whereby it may be lifted up from its normal rest position flat against the door and the map viewed through the transparent cover member without removing the map from the pouch.

Also included among the objects of the invention is to provide a new and improved door supported pouch which by virtue of the construction of the related parts converts the trim around the door of an automobile into a bracket on which the pouch may be hung, the attaching parts being compressible and deformable to a degree sufficient to permit attachment and detachment of the pouch to the trim without otherwise dismantling or unfastening the trim from the door.

Other objects and advantages of my present invention will be apparent from the following description and claims, the novelty of my invention consisting in the features of construction, the combinations of parts, the novel relations of the members and the relative proportioning, disposition and operation thereof, all as is more completely described herein and as is more particularly pointed out in the appended claim.

In the accompanying drawings, forming a part of my present specification:

FIGURE 1 is a perspective view, partly broken away, illustrating the invention in assembled relationship over the panel of an automobile door.

FIGURE 2 is a vertical section on the line 2—2 of FIGURE 1.

FIGURE 3 is a side perspective view of another form of the invention attached to an automobile door panel.

FIGURE 4 is a longitudinal sectional view of the form of invention of FIGURE 3.

FIGURE 5 is a side elevational view of the form of invention of FIGURE 3.

In an embodiment of the invention chosen for the purpose of illustration there is shown in fragmentary form for purposes of convenience an automobile door indicated generally by the reference character 10 provided with an inside panel 11, a window 12, and a molding or trim around the window including a lower molding element 13 and a lateral molding element 14. In this embodiment the molding or trim is shown as being attached to the panel by screws 15, although it will be appreciated that other more modern and convenient means of attachment may be employed without making use of screws which remain visible on the exposed face of the trim. The trim includes a decorative exposed face 16 which bows laterally away from the face of the panel 11, forming a recess 17 behind the trim. There is, moreover, a lower curved portion 18 which extends toward the face of the panel 11 so that an edge 19 of the trim tends to be normally impressed against the exposed surface of the panel 11. The trim is of a relatively flexible character in that it may be sprung slightly at the lower curved portion 18 without permanent distortion and also without the need necessarily of loosening the screws 15 or such other means of attachment as may be employed.

For attachment to the trim, there is provided a pouch indicated generally by the reference character 20. The pouch in the embodiment chosen has an upper portion 21 which at the uppermost extremity is molded over a flexible rod 22, thereby to form a bead 23. Stitching 24 or other appropriate means of attachment may be employed to fasten the outermost edge of the upper portion 21 against itself so as to firmly hold the flexible rod in position.

It is important to note that the flexible rod is preferably of some compressible and deformable means, such, for example, as a fiber cord or, even more to be desired, a compressible rod of synthetic plastic material having an appreciable degree of resiliency so that it will distend to a normally round condition even after being pressed into a relatively flat temporary shape. The stitching 24 is applied firmly enough so that the rod is securely held in position and is not likely to slip from the folded upper portion 21 of the pouch. With the rod and the upper portion acting together to form the substance of the bead 23, there is provided a bead of considerable firmness at the upper extremity of the pouch but which is at the same time one capable of being deformed to a degree when the pouch is being fastened to the trim.

Although the pouch may take various forms, a rectangular form has been selected and the pouch further provided with a pocket-forming sheet 25 having stitching 26 around the side edges, the pocket forming sheet preferably being an upwardly doubled portion of a rear sheet 27 providing a fold 28 therebetween. Formed in this fashion the sheets are provided with an opening 29 immediately behind an upper edge 29' of the pocket-forming sheet, thereby making the interior of a pocket thus formed accessible for holding sundry items which may include folded highway maps, papers, addresses, directions and other appropriate paraphernalia which can be conveniently carried in an accessible position against the inside panel of the door 10.

Of further convenience is the provision of a transparent pocket 30 which is formed by attaching a substantially transparent sheet 31 to the pocket-forming section 25 as, for example, by employment of stitches 32 around the side and bottom edges. In making the pocket transparent, there is provided a handy carrier for maps which may be opened to the section being used which is placed facing outwardly in the transparent pocket so that they can be easily read by the person sitting next to the door and then conveniently dropped where they will hang in an accessible position for use again whenever necessary.

Of further consequence is the fact that the pouch with respect to all of its parts constructed of the sundry sheets is extremely flexible so that together with the flexibility and compressibility inherent in the bead 23, the pouch can accommodte itself to the panel 11 even though there may be some variation in contour of the panel and also of the trim 13.

In use the pouch can be assembled in position beneath the panel merely by springing the lower curved portion 18 outwardly sufficient to squeeze the bead underneath it far enough to fall within the recess 17. The lower curved portion need be sprung outwardly only a very slight distance because of the fact that the bead is readily compressible into a flat configuration and forced gently but adequately into the crack thus formed until the entire bead is contained within the recess. Further still, by reason of the fact that the bead is readily flexible and bendable, it can be tilted during application in an angular direction until entirely received within the recess 17 whereafter it can be shifted endwise to any desired location suspended with respect to the trim 13. Further still, by reason of the fact that the bead is a well-defined enlargement at the upper edge of the pouch, once in position with the edge 19 of the lower curved portion 18 bearing directly against the pouch immediately beneath the bead, the pouch is firmly and securely suspended in position by the trim despite the compressible nature and character of the bead itself.

On those occasions where it might become necessary to entirely remove the pouch, the reverse process can be employed, namely, the trim can be sprung slightly sufficient to pull one end or the other of the bead out from under the trim, whereafter the bead can readily be removed as it is compressed beneath the edge of the trim without damage either to the trim or to the bead itself.

In a second form of the device illustrated in FIGURES 3, 4 and 5 there is shown a pouch, indicated generally by the reference character 35, which in the main is constructed of a rear sheet 36 and a front sheet 37 spaced a slight distance apart forming a pocket 38 in which is positioned a filler or stiffener 39 of some appropriate flexible material. The rear and front sheets are secured together, as for example by heat sealing, where the material is a flexible plastic material, along a bottom edge 40 and along side edges 41 and 42. The filler or stiffener 39 is slightly shorter than the full depth of the pocket so that the front and rear sheets are in engagement with each other along a margin 43 at the top. There is also a line of heat sealing 44 immediately adjacent the topmost edge.

In this example a bead 45 is constructed of an interior rod 46 of some spongy or compressible material of appreciable body, the rod being encased in a jacket 47 of flexible thin-walled plastic material. If preferred, the bead may be attached by heat sealing at opposite ends 48 and 49 to anchor it approximately in the desired position.

To further secure the bead in position and to provide additional features, there is employed a flap 50 of substantially transparent material. The flap is heat sealed along the line of heat sealing 44 which attachment can be accomplished at the same time and by the same operation which is employed for attaching the front and rear sheets together. An upper section 51 of the flap overlies the bead 45. A line of heat sealing 52 is employed to attach the lower edge of the upper section 51 to the front sheet 37, thus to form a space 53 within which the bead is confined. The attachment of the upper section 51 may be relatively snug and hence even though the bead is tacked only at its opposite ends, the pressure against it of the upper section 51 will hold the bead properly located.

A transparent forward sheet 54 is attached, as for example by means of heat sealing, along the side edges 41 and 42 and the bottom edge 40 by the same operation employed for attaching the front and rear sheets together. This provides a transparent envelope space 55, the upper or open end of which is defined by an edge 56 of the forward sheet. There is considerable space between the edge 56 and the upper portion of the pouch but this is covered over and protected by the flap 50. Since both the flap and the forward sheet are transparent, these parts together form a completely transparent envelope space or pocket section in which may be carried a map book indicated by the broken lines 57.

The structure in this form also of the device is such that it is completely flexible and can adjust itself to various contours of the door of a vehicle. Also, the bead in its assembled form is compressible as well as flexible and permits application of the beaded portion of the pouch to a location beneath the trim of an automobile door in the same manner as has been explained in connection with FIGURES 1 and 2. This form of the device has all of the advantages of the first described form and in addition provides a relatively large envelope space in which large sheets or map books can be tucked in an exposed condition readily readable through the transparent material. By making the width of the flap 50 slightly less than the width from side to side of the envelope space, it is possible to tuck the flap into the space without providing large folds or wrinkles and thus leave the top portion of the envelope space open in order to easily extract and replace the contents.

From the foregoing description it will be appreciated that there has been provided an assembly of parts constituting a pouch which may adequately be defined as a sub-assembly and a suspending element or bracket embodied in the trim 13 which is applied at the top of the panel 11. These parts working together make an extremely convenient means of holding the pockets in a readily accessible position, the position moreover of which can be shifted to a degree to different locations with respect to the face of the panel 11 as occasion may suggest.

Further, by reason of constructing the pouch of soft flexible material and imparting also the same soft flexibility to the bead 23, there is no likelihood of scratching the trim or the face of the panel 11 at any time either during application of the pouch to the door or removal therefrom.

While the invention has herein been shown and described in what is conceived to be the most practical and preferred embodiment, it is recognized that departures may be made therefrom within the scope of the invention, which is not to be limited to the details disclosed herein but is to be accorded the full scope of the claim so as to embrace any and all equivalent devices.

Having described the invention, what is claimed as new in support of Letters Patent is:

A flexible pouch comprising a rear sheet of relatively thin flexible material, a front sheet of said material overlying said rear sheet and forming a pocket therebetween and a flexible sheet filler in said pocket, said sheets being secured at the top edge, and a margin adjacent said top edge, a linearly continuous bead of flexible resilient compressible material overlying said margin and attached thereto, a forward sheet of transparent flexible material attached to the front sheet at side and bottom edges forming an envelope space open at the top and of less depth than said pocket, and a flap of transparent flexible material secured over said bead along upper and lower parallel spaced seal lines to said margin whereby to secure said bead and simultaneously to provide a cover for the open top of said envelope space, said margin and the bead thereon forming means to attach said pouch to a suitable support.

References Cited in the file of this patent

UNITED STATES PATENTS

| | | |
|---|---|---|
| 1,486,566 | Crecelius | Mar. 11, 1924 |
| 1,606,944 | Johnson | Nov. 16, 1926 |
| 1,991,358 | Bessy | Feb. 19, 1935 |
| 2,656,869 | Timmons | Oct. 27, 1953 |
| 2,673,056 | Manetti | Mar. 23, 1954 |
| 2,673,670 | Steele | Mar. 30, 1954 |

FOREIGN PATENTS

| | | |
|---|---|---|
| 195,588 | Austria | June 15, 1957 |